United States Patent

Scorsiroli

[11] Patent Number: 5,927,608
[45] Date of Patent: Jul. 27, 1999

[54] WASHING LIQUID HEATING

[75] Inventor: Marcello Scorsiroli, Turin, Italy

[73] Assignee: Cooper Automotive Products, Inc., Houston, Tex.

[21] Appl. No.: 08/654,325

[22] Filed: May 28, 1996

[30] Foreign Application Priority Data

May 29, 1995 [IT] Italy .................................. TO950121 U

[51] Int. Cl.⁶ .................................................. B05B 1/10
[52] U.S. Cl. ...................... 239/284.1; 239/135; 239/139; 239/130; 392/481
[58] Field of Search ............................ 239/284.1, 284.2, 239/130, 135, 139; 392/479, 480, 481; 122/14

[56] References Cited

U.S. PATENT DOCUMENTS

| 3,630,184 | 12/1971 | Wolf | 392/481 X |
| 4,508,957 | 4/1985 | Rocchitelli | 239/284.1 X |
| 4,589,374 | 5/1986 | Farina | 122/14 |
| 5,354,965 | 10/1994 | Lee | 239/284.1 X |

FOREIGN PATENT DOCUMENTS

| 2634090 | 1/1990 | France . |
| 2707230 | 1/1995 | France . |
| 0051764 | 4/1977 | Japan | 392/481 |

OTHER PUBLICATIONS

European Search Report dated Aug. 3, 1996.

*Primary Examiner*—Andres Kashnikow
*Assistant Examiner*—Steven J. Ganey
*Attorney, Agent, or Firm*—Fish & Richardson PC

[57] ABSTRACT

A device for heating washing liquid to be sprayed onto a vehicle windshield includes a thermally insulating body and a heating element configured to be heated in response to an applied electric current. The heating element is positioned within the thermally insulating body. A path is defined along a surface of the heating element to permit passage of the washing liquid along the surface of the heating element so that the washing liquid is heated by contact with the surface of the heating element.

5 Claims, 2 Drawing Sheets

WASHING LIQUID HEATING

BACKGROUND OF THE INVENTION

The invention relates to heating the washing liquid to be sprayed onto a vehicle windshield.

Heating devices that use an electric heater to keep a certain volume of liquid at a desired temperature are known. Devices of this type are rarely used in vehicles, particularly because of their high cost.

SUMMARY OF THE INVENTION

The invention provides a device for heating liquid for washing a vehicle windshield, the liquid being intended to remove deposits, insect bodies, tree resin and any other form of solid dirt adhering to the windshield. In the presence of dirt of this type, the softening properties of the hot liquid considerably facilitate the cleaning of the windshield and prevent or at least limit damage to the windshield-wiper blades, which are extremely sensitive to the presence of hard deposits on the windshield. The heating of the washing liquid is also useful in winter when ice is formed on the windshield.

A device according to the invention includes a glow plug of the type normally used for pre-heating diesel engines. The glow plug has a stem that can be heated by the application of an electric current. The stem is coupled to a body of thermally insulating material and a helical path for the fluid to be heated is defined between the body and stem. Fluid moving along the helical path comes directly into contact with the heated stem.

Unlike previously known solutions, the device according to the invention heats the washing liquid as the liquid is pumped from the reservoir. The direct contact of the liquid with the incandescent stem of the glow plug enables an operating temperature (e.g., 40° C.) that is sufficient to soften hard and resistant deposits present on the windshield to be reached in a few seconds. The glow plug of the device is supplied with an electric current solely upon activation of the pump for the washing liquid. The plug is heated quickly and the stem becomes incandescent in a few seconds. To reduce further the time taken to heat the flow of washing liquid, two or more heating devices may be arranged in series.

The heating device provides an accessory that can be installed in any model of vehicle without the need to make substantial changes in the arrangement of the components of the washing circuit at the design stage.

In one aspect, generally, the invention features a device for heating washing liquid to be sprayed onto a vehicle windshield. The device includes a thermally insulating body and a heating element configured to be heated in response to an applied electric current. The heating element is positioned within the thermally insulating body. A path defined along a surface of the heating element permits passage of the washing liquid along the surface of the heating element so that the washing liquid is heated by contact with the surface of the heating element.

Embodiments of the invention may include one or more of the following features.

The heating element may be a stem of a glow plug, and the path may be a helical path along a surface thereof. The stem may be positioned in a hole within the body, and may have a smooth outer surface, in which case, an internal surface of the hole defines the path in conjunction with the smooth outer surface of the stem. Similarly, the hole may have a smooth inner surface, and an external surface of the stem may define the path in conjunction with the smooth inner surface of the hole. The internal surface of the hole may be rendered impermeable to the washing fluid by means of a varnish resistant to high temperatures.

In another aspect, generally, the invention features a system for delivering heated washing fluid. The system includes a fluid reservoir, a spray nozzle, a supply line between the fluid reservoir and the spray nozzle, and a heating device positioned between sections of the supply line. The heating device includes a heating element configured to heat the washing fluid through contact of the washing fluid with a surface of the heating element.

Embodiments of the system may include one or more of the features noted above as well as one or more of the following features.

The system may include a controller configured to deliver electric current to the heating device for heating the heating element. When the system includes a pump positioned between sections of the supply line and configured to pump washing fluid from the reservoir to the spray nozzle, the controller may be configured to deliver electric current to the heating device only when the pump is activated.

The system may also include one or more additional heating devices. These heating devices may be arranged, for example, in a series relationship.

In yet another aspect, generally, the invention features a method of heating washing fluid. The method includes supplying washing fluid from a fluid reservoir to a heating device. At the heating device, a heating element is heated by applying an electric current to the heating element, and the washing fluid is heated by passing the washing fluid along a surface of the heating element to transfer heat from the heating element to the washing fluid.

Other features and advantages of the invention will become apparent from the following description of the preferred embodiment, including the drawings, and from the claims.

DESCRIPTION OF THE PREFERRED EMBODIMENTS

Figure 1:
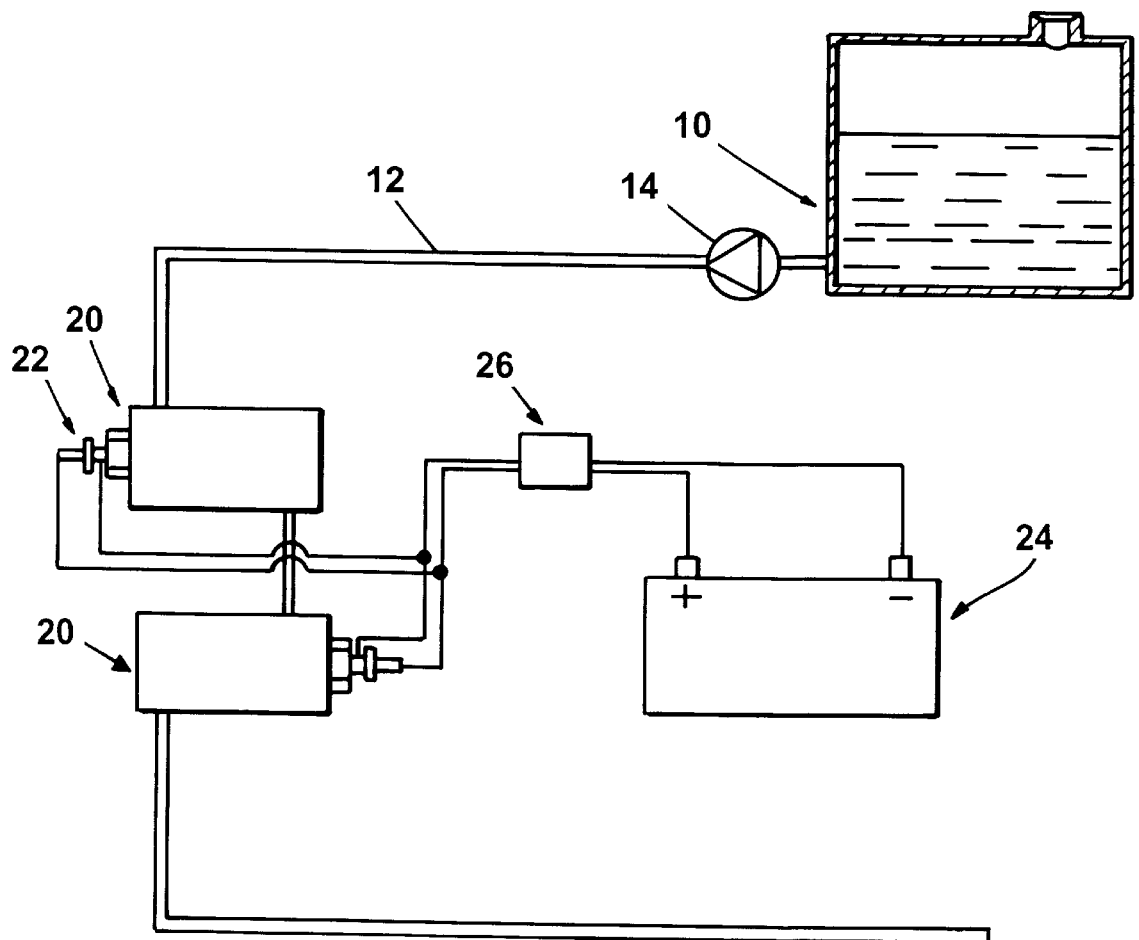
FIG. 1 is a block diagram illustrating heating devices in a system for supplying windshield washing liquid.

With reference to FIG. 1, a reservoir 10 contains washing liquid that is supplied along a line 12 by a pump 14. The line 12 supplies the washing liquid to one or more spray nozzles 16 that send jets of washing liquid onto the windshield 18 or other window of the vehicle.

Two heating devices 20 are arranged in series along the line 12 for heating the flow of washing liquid as the liquid passes along the line 12. The number and arrangement of heating devices may be varied according to specific requirements. More precisely, in some cases a single heating device 20 may suffice. Similarly, if it is desired to reduce the time taken to heat the washing fluid, several devices of the same type may be arranged in series. When larger amounts of washing fluid are desired, larger devices or devices arranged in parallel may be employed.

Each heating device 20 has an electric heating element 22 that is connected to a battery 24 of the vehicle. A control element 26 is provided in the electric supply line to the heating element 22. The control element 26 may be, for example, a relay that supplies electric current to the heating element 22 only when a flow of heated liquid is required. The control element 26 may be activated simultaneously with the pump 14 and also may be subject to a control, such as a thermostatic control dependent upon the temperature of the heating element 22 and/or the environmental temperature.

Figure 2:
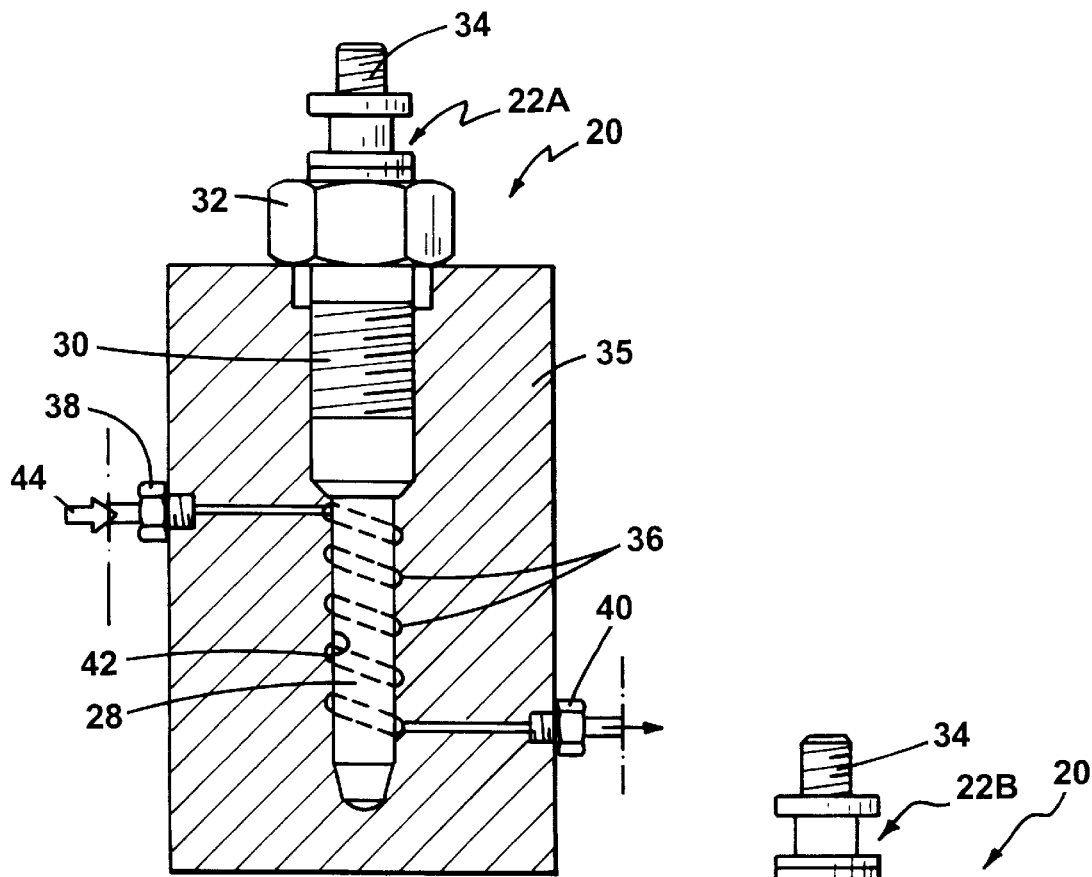
FIG. 2 is a schematic view of a heating device.

With reference now to FIG. 2, the heating element 22 may comprise a glow plug 22A of the type normally used for pre-heating diesel engines. The plug 22A includes a stem 28 that may be brought to a very high temperature in a few seconds by the application of an electric current. The plug 22A also includes a threaded attachment portion 30 and an electrical connection portion 34.

The plug 22A is coupled to a body 35 made of thermally insulating material. A helical path 36 for the fluid to be heated is defined between the body 35 and the stem 28 of the plug 22A. The helical path 36 communicates at its ends with connectors 38 and 40 for connection to the washing-liquid supply line 12.

The helical path 36 is defined by a thread formed in a hole 42 having the same diameter as the stem 28. The stem 28 has a smooth outer surface that closes the hole 42 in a substantially sealed manner so that the liquid supplied to the inlet connector 38 in the direction indicated by the arrow 44 is forced to travel along the helical path 36 before reaching the outlet connector 40. Along the helical path 36, the liquid is directly in contact with the incandescent stem 28 and can thus be heated very rapidly.

The insulating body 35 may be made of refractory or sintered material which may be porous to the washing liquid. In this case, the hole 42 and the thread defining the helical path 36 may be made impermeable by means of varnishes resistant to high temperatures.

Figure 3:
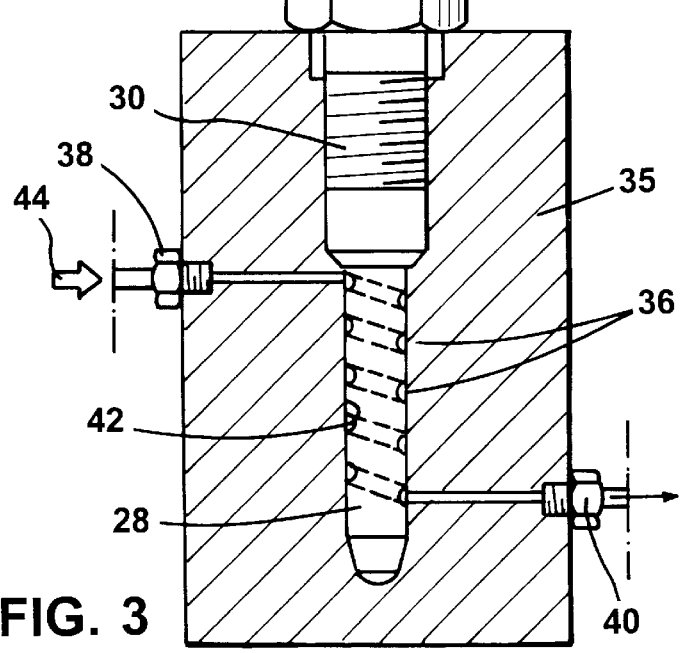
FIG. 3 is a schematic view of an alternative heating device.

FIG. 3 shows device that includes an alternative plug 22B. Parts corresponding to those described above are indicated by the same reference numerals. With the plug 22B, the hole 42 in the thermally insulating body 35 has a smooth inner wall and the helical path 36 is formed on the stem 28 of the plug 22B. The coupling between the stem 28 and the hole 42 achieves a seal adequate to ensure that the fluid coming from the inlet connector 38 flows along the helical path 36 and is heated by direct contact with the incandescent stem 28.

Other embodiments are within the following claims.

What is claimed is:

1. A system for delivering heated washing fluid, comprising:
    a fluid reservoir configured to hold a supply of washing fluid,
    a spray nozzle configured to spray washing fluid,
    a supply line between the fluid reservoir and the spray nozzle, and
    a heating device positioned between sections of the supply line, the heating device including:
        a thermally insulating body;
        a slow plug including a stem configured to be heated in response to an applied electric current, the stem being positioned within the thermally insulating body; and
        a path defined along a surface of the stem to permit passage of the washing fluid along the surface of the stem;
        wherein the washing fluid is heated by direct contact with the surface of the stem.

2. The system of claim 1, further comprising a controller configured to deliver electric current to the heating device for heating the atom of the glow plug heating element.

3. The system of claim 2, further comprising a pump positioned between sections of the supply line and configured to pump washing fluid from the reservoir to the spray nozzle, wherein the controller is configured to deliver electric current to the heating device only when the pump is activated.

4. The system of claim 1, further comprising a second heating device element positioned between sections of the supply line, the second heating device including a heating element configured to heat the washing fluid through contact of the washing fluid with a surface of the heating element.

5. The system of claim 4, wherein the first and second heating devices are arranged in a series configuration so that washing fluid heated by contact with the stem by the glow plug is also heated by contact with the heating element.

* * * * *